June 6, 1944. A. H. DICKINSON 2,350,499
MULTIPLYING MACHINE
Filed Dec. 24, 1940 9 Sheets-Sheet 1

INVENTOR
Arthur H. Dickinson
BY
W. M. Wilson
ATTORNEY

June 6, 1944.  A. H. DICKINSON  2,350,499
MULTIPLYING MACHINE
Filed Dec. 24, 1940  9 Sheets-Sheet 2

INVENTOR
Arthur H. Dickinson
BY
ATTORNEY

June 6, 1944.　　A. H. DICKINSON　　2,350,499
MULTIPLYING MACHINE
Filed Dec. 24, 1940　　9 Sheets-Sheet 3

FIG.9.

064 MULTIPLIED BY 6

```
  2 4   } OBTAINED BY ADVANCING
3 6           READ-OUT WIRING.
─────
0 3 8 4    PRODUCT FORMED IN
           RESULT ACCUMULATOR
           BY ENTRY OF ONLY
           SINGLE DIGITS.
```

FIG.10.

067 MULTIPLIED BY 6

```
  4 2   } OBTAINED BY ADVANCING
3 6           READ-OUT WIRING
     1  } OBTAINED BY ADVANCING
           READ-OUT WIRING UNDER
           CARRY DETERMINING
           CONTROL.
─────
0 4 0 2    PRODUCT FORMED IN
           RESULT ACCUMULATOR
           BY ENTRY OF ONLY
           SINGLE DIGITS.
```

FIG.11.

167 MULTIPLIED BY 6

```
  4 2   } OBTAINED BY ADVANCING
3 6           READ-OUT WIRING
    6 1 } OBTAINED BY ADVANCING
           READ-OUT WIRING UNDER
           CARRY DETERMINING
           CONTROL
─────
1 0 0 2    PRODUCT FORMED IN
           RESULT ACCUMULATOR
           BY ENTRY OF ONLY
           SINGLE DIGITS
```

FIG.6.

COMBINATION OF TWO DIGITS WHICH REQUIRES A CARRY IN A THIRD MULTIPLE ORDER, WHEN MULTIPLYING BY A GIVEN MP DIGIT.

| MP-3 | MP-4 | MP-6 |
|---|---|---|
| 34 67 | 25 75 | 34 84 |
| 35 68 | 26 76 | 35 85 |
| 36 69 | 27 77 | 36 86 |
| 37 | 28 78 | 17 37 67 87 |
| 38 | 29 79 | 18 38 68 88 |
| 39 | | 19 39 69 89 |

FIG.7.

| MP-7 | MP-8 | MP-9 |
|---|---|---|
| | 13 63 | 12 |
| | 14 64 | 13 23 |
| 43 73 | 15 25 65 75 | 14 24 34 |
| 44 74 | 16 26 66 76 | 15 25 35 45 |
| 45 75 | 17 27 67 77 | 16 26 36 46 56 |
| 15 46 76 86 | 18 28 38 68 78 88 | 17 27 37 47 57 67 |
| 16 47 77 87 | 19 29 39 69 79 89 | 18 28 38 48 58 68 78 |
| 17 48 57 78 88 | | 19 29 39 49 59 69 79 89 |
| 18 49 79 89 | | |
| 19 29 49 79 89 | | |

FIG.8.

COMBINATION OF TWO MC DIGITS, WHOSE RIGHT HAND DIGIT APPEARS AS THE LEFT HAND DIGIT OF ANY FIG. 6 OR 7 COMBINATION FOR THE SAME MP DIGIT, AND WHICH REQUIRES A CARRY IN A FOURTH MULTIPLE ORDER, WHEN MULTIPLYING BY A GIVEN MP DIGIT.

| MP-3 | MP-6 | MP-7 | MP-8 | MP-9 |
|---|---|---|---|---|
| 33 | 16 | 14 | 12 | 11 |
| 66 | 33 | 28 | 37 | 22 |
| | 66 | 42 | 62 | 33 |
| | 83 | 57 | 87 | 44 |
| | | 71 | | 55 |
| | | 85 | | 66 |
| | | | | 77 |
| | | | | 88 |

FIG.4.

```
         889  MC
         496  MP
       ─────
ENTER INTO PR ACC.  5334    1ˢᵗ MULTIPLYING CYCLE
ENTER INTO PR ACC.  8001    2ⁿᵈ MULTIPLYING CYCLE
ENTER INTO PR ACC.  3556    3ʳᵈ MULTIPLYING CYCLE
                   ──────
                   440944   PRODUCT
```

FIG.5.

```
         874  MC
         205  MP
       ─────
ENTER INTO PR ACC.  4370    1ˢᵗ MULTIPLYING CYCLE
ENTER INTO PR ACC.  1748    2ⁿᵈ MULTIPLYING CYCLE
                   ──────
                   179170   PRODUCT
```

INVENTOR
Arthur H. Dickinson
BY
*[signature]*
ATTORNEY

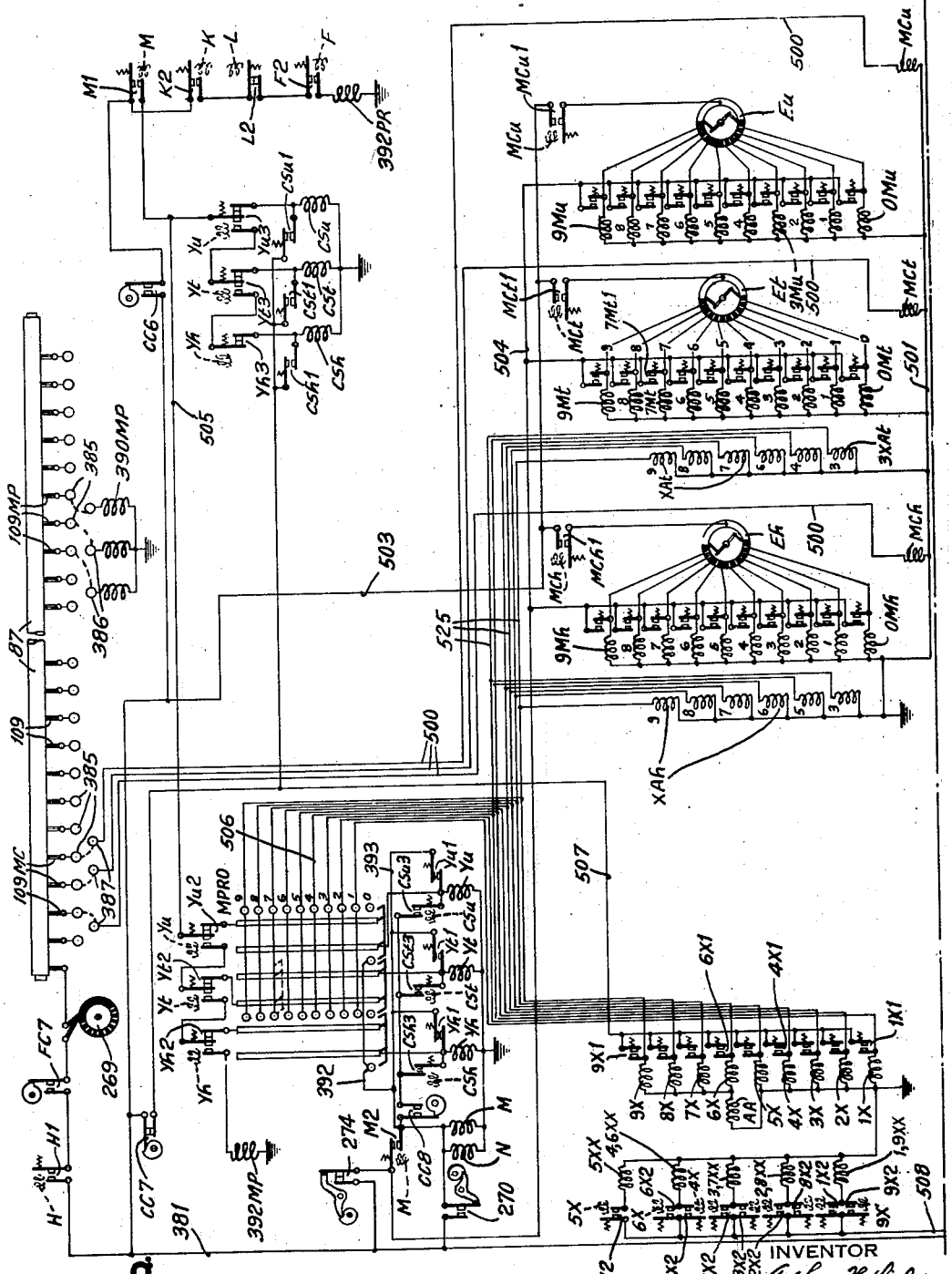

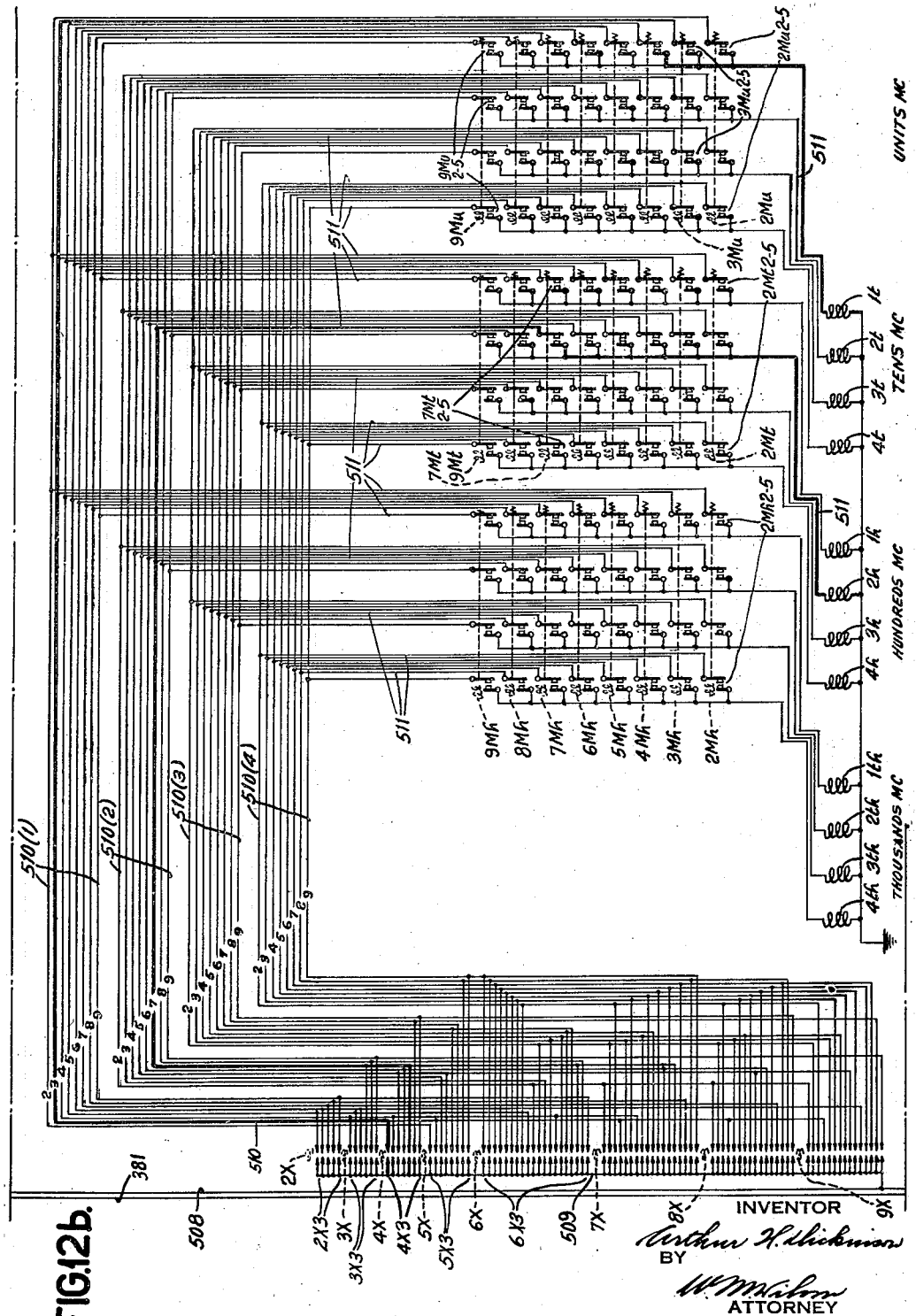

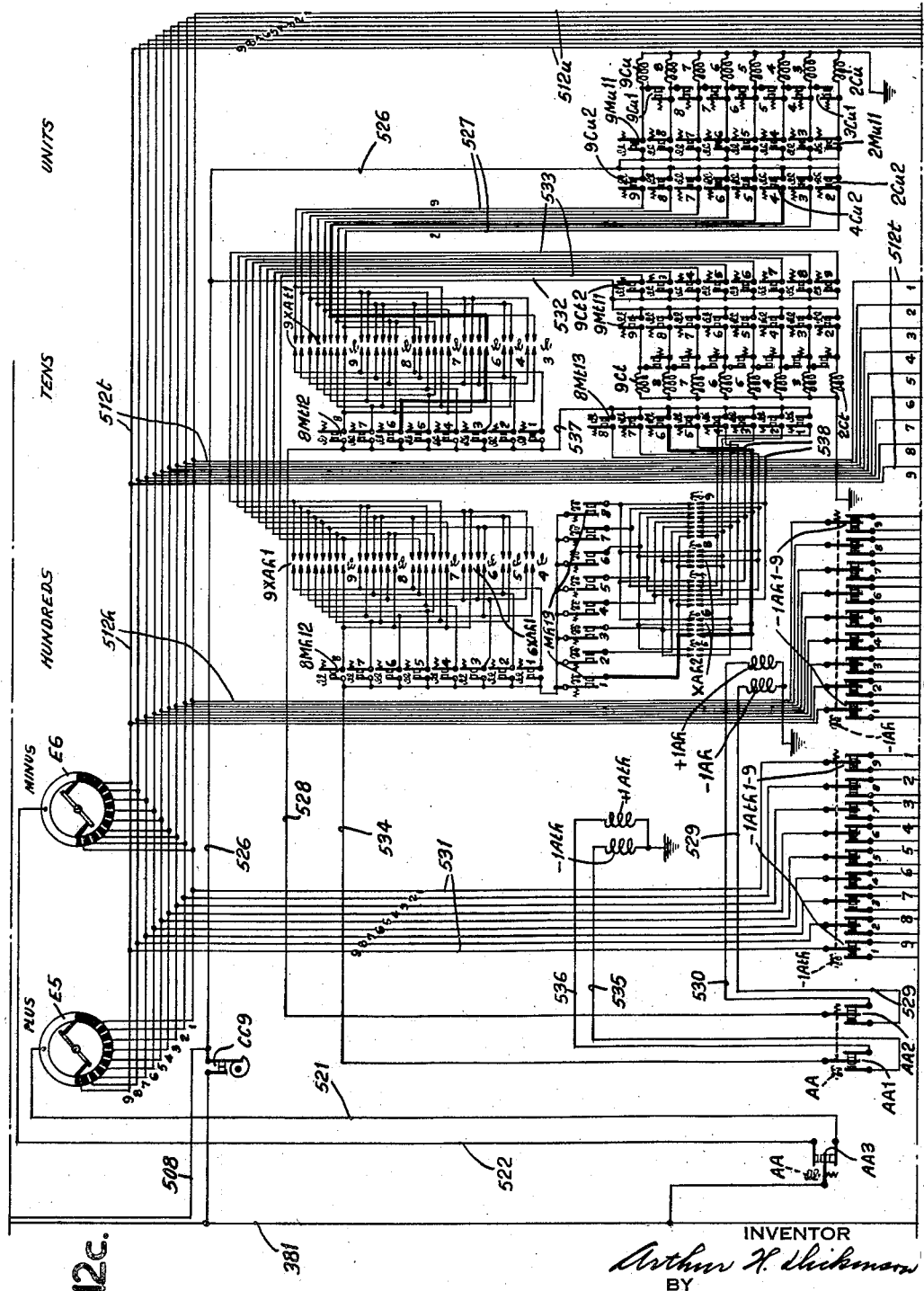

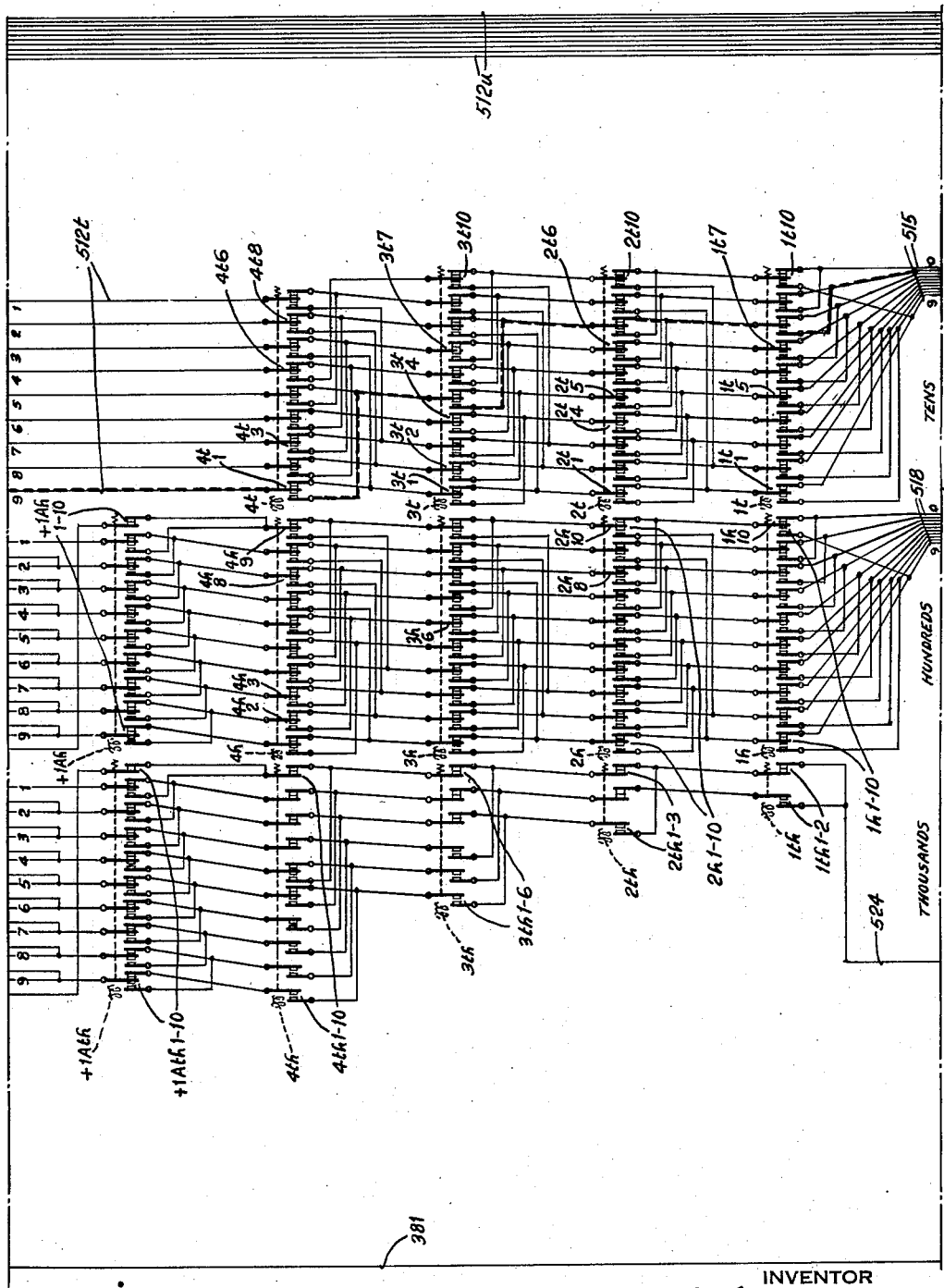

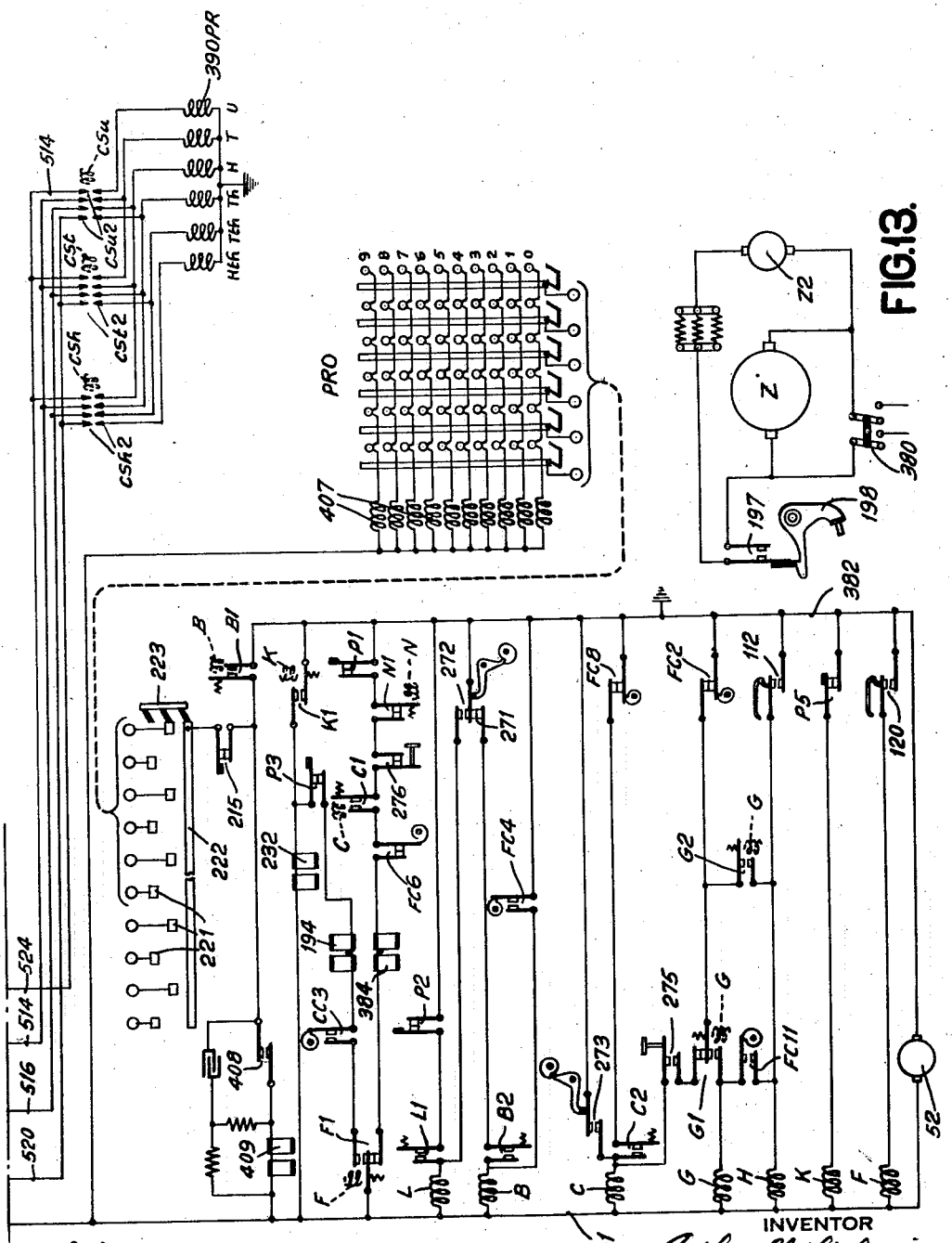

Patented June 6, 1944

2,350,499

UNITED STATES PATENT OFFICE 2,350,499

MULTIPLYING MACHINE

Arthur H. Dickinson, Scarsdale, N. Y., assignor to International Business Machines Corporation, New York, N. Y., a corporation of New York Application December 24, 1940, Serial No. 371,506

16 Claims. (Cl. 235—61.6)

This invention relates to record card controlled multiplying machines of the partial products type and more particularly to improvements in the manner and method of automatically combining the computed components to form the complete product.

In commercial multiplying machines, particularly electrically controlled machines, multiplication is carried out for a digit of a multiplier by separately obtaining the left hand and right hand partial products in what are known as left hand and right hand partial product accumulators, and then transferring one to the other with suitable columnar displacement to form the complete product. Such arrangements employ two sets of digit lines which, under control of multiplier and multiplicand setup devices, direct the proper partial product impulses from an emitter to the related accumulators.

According to the present invention, the left hand and right hand partial product impulses are in effect merged and conducted through a single set of wires to effect a single entry into a single accumulator representing the complete product. Specifically, the set of wires is potentially adjusted to transmit right hand components, but prior to the time of transmission the left hand components are ascertained and control readjustment of the circuits, so that the complete product is directly entered.

A further object of the invention is to provide novel mechanism for predetermining whether tens carry digits are involved in a multiplication of a multiplicand amount and a multiplier digit and for effecting suitable further adjustment of the entering circuits when such digits are involved in the formation of the complete product.

Other objects of the invention will be pointed out in the following description and claims and illustrated in the accompanying drawings, which disclose, by way of example, the principle of the invention and the best mode, which has been contemplated, of applying that principle.

In the drawings:

Figs. 4 and 5 are examples showing the steps involved in the solution of problems.

Figs. 6 and 7 are tables upon which certain of the wiring arrangement is based.

Fig. 8 is a further table upon which other wiring connections are based.

Figure 1:
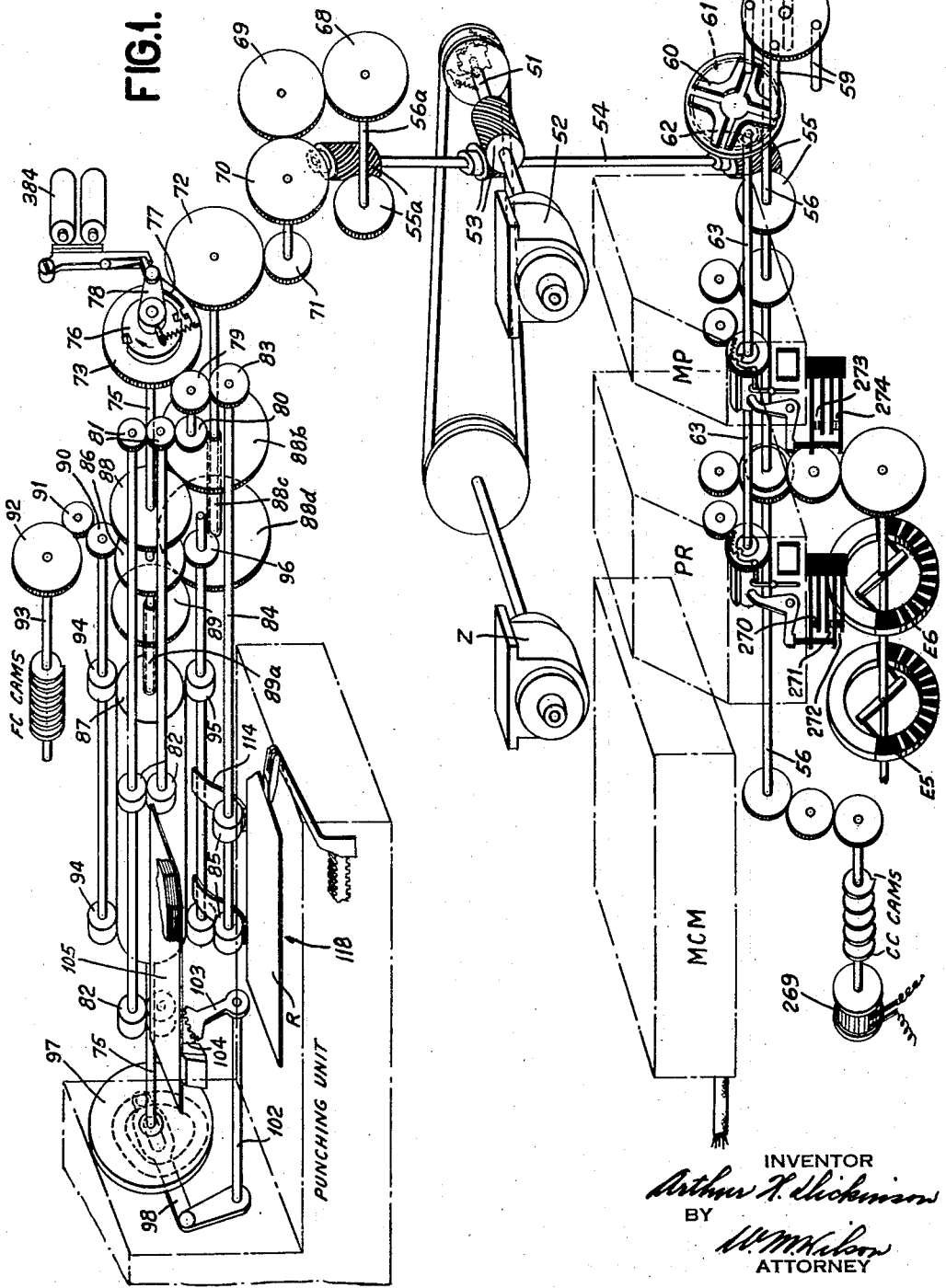
Fig. 1 is a diagrammatic view showing the relative location and drive for the component parts of the multiplying machine.

Figs. 9, 10 and 11 indicate diagrammatically the derivation of the component parts of products.

Figs. 12a, 12b, 12c, 12d, 12e and 12f, when taken together and placed one below the other in the order named, constitute a wiring diagram of the electric circuits of the machine.

Fig. 13 shows a wiring of the driving motor.

MACHINE DRIVE

The machine is adapted to be driven by a constantly running motor Z (Fig. 1), which motor through a belt and pulley and ratchet drive drives a shaft 51, which in turn drives a D. C. generator 52.

Shaft 51, through worm gear drive 53, drives a vertical shaft 54 for driving the units of the upper and lower sections of the machine. At its lower end shaft 54 through worm gear 55 drives the main drive shaft 56. The accumulators are driven from this shaft in the customary manner. The reset drive for the accumulator units is provided as follows. Shaft 56 carries a spur gear 57, driving a gear 58 with a four to one drive ratio. Gear 58 has extending from it four Geneva pins 59 cooperating with the other or cross element of the Geneva designated 60. Secured to 60 is an internal gear 61 meshed with the spur gear 62 mounted on the end of the reset shaft 63.

The accumulators are reset from this reset shaft in the customary manner by electromagnetically controlled one revolution clutches. Shaft 54 at its upper end drives a cross shaft 56a through gears 55a.

CARD FEED AND CARD HANDLING UNIT DRIVE

Referring to Fig. 1, the shaft 56a is provided with a gear 68, which through an idler gear 69 drives a gear 70, which through its shaft drives gear 71, which gear 71 in turn drives gear 72. Gear 72 in turn drives a gear 73 revolubly mounted on shaft 75. Gear 73 has fixed to it one element 76 of the one revolution clutch, the complemental part of which comprises a pawl 77, carried by an arm 78 which is fixed to shaft 75. The one revolution clutch is of the customary electromagnetic type used in tabulating machines and, with this one revolution clutch engaged by the energization of its clutch magnet, the shaft 75 will rotate in unison with gear 73, and, with the one revolution clutch disengaged, 73 will continue its rotation and shaft 75 will remain stationary.

Gear 73 also drives an intermediate gear 79, which is fixed to the gear 80 which drives a train of gears 81 and which gears 81, in turn, drive the card feed rolls 82 of the machine. Such card feed rolls 82 are constantly rotating feed rolls, the same rotating at all times when gear 73 is rotating and when the main accumulator drive shaft is rotating. Also in train with gear 79 is a gear 83, which gear constantly drives a drag roll shaft 84, having fixed thereon a pair of drag rolls 85.

As shown, the one revolution clutch element 76 is provided with two notches and the arrangement of this clutch is such that, when the pawl 77 is engaged, the element 78 of the one revolution clutch will make one complete revolution. The one revolution pawl 77 can be engaged in either of the two notches of the clutch element 76, which relation of the clutch members is provided because, after the machine has been started and is running on a run of cards, one accumulator cycle is required to traverse the card and carry it past the sensing brushes and another cycle is required to deliver the card to the punching section of the machine.

Fixed to shaft 75 is a gear 88 which drives a gear 88b mounted on the sleeve 88c, which in turn drives a gear 88d. Gear 88d in turn drives gear 89 which is fixed to the sleeve 89a revolubly mounted on shaft 75 but fixed to the card transfer and contact cylinder 87.

DRIVE TO INTERMITTENTLY ACTUATED CONTACTS

Gear 86 is fixed to shaft 75 and drives a gear 90, which gear in turn drives an idler gear 91 driving a gear 92 fixed to cam contact shaft 93. Shaft 93 has secured upon it a number of cams for actuating the FC group of cam contact devices of the machines. Such cams are so driven that they make one revolution per card feed cycle in contradistinction to a machine cycle. Fixed to the shaft of gear 90 are card feed rolls 94, which are spring pressed into contact with card transfer and card contact cylinder 87. Similar spring pressed card feed rolls 95 also cooperate with the transfer and contact roll 87, and such rolls are driven by the gear 96 in train with gear 86. Rolls 94 and 95 are preferably made of insulating material.

CARD PICKER DRIVE

Shaft 75 has secured to it a box cam 97 with which a follower 98 cooperates. The follower rocks a rock shaft 102 carrying a gear sector 103, which is in engagement with a picker block 104. Upon engagement of the one revolution clutch, the picker is called into action to withdraw a single card from the magazine 105 (Fig. 2) and advance this card into the bite of rolls 82. These rolls in turn forward the card to the card transfer and contact roll 87. A curved card guide is provided around the transfer cylinder, and the advancing card is carried around by the forward rotation of the transfer cylinder and by the rotation of rolls 94 to traverse the card sensing brushes generally designated 109 in Fig. 2. Also in cooperation with the card is a pivoted card lever 111 adapted to operate the usual card lever contacts 112.

After the card has been sensed by the main sensing brushes 109, it is advanced between guiding members 114 and 115 by the cooperation of feed rolls 95 with cylinder 87. While between these members, it is advanced by drag rolls 85 which extend downwardly into recesses of the lower guiding members 114, as shown in Fig. 1. This arrangement provides for the feeding of the card and the advance of the card after it has been released by the rolls 95, so that the card may be delivered into the tray of the punching section of the machine. The drag rolls 85 deliver the card under the guiding member 117 (Fig. 2) and, after the card has been freed from the drag rolls, the card is flipped down into the tray of the punching section of the machine. The location of this tray is generally designated at 118, and the position of the card in this tray is indicated at R in Fig. 1. A card lever 119 (Fig. 2) is also provided adjacent the tray for closing card lever contacts 120, when the card is lodged in the tray of the punching section of the machine.

With the traverse of the card past the sensing brushes 109, the amount of the multiplier and multiplicand will have been read from the card and entered into the MP and MC receiving devices of the machine. The MP receiving device is of the usual type as customarily used in tabulating machines and is provided with electromagnetically operated clutches.

The mechanical structure of the machine is thus substantially that of Patent 2,045,437, and in the present case the same reference numerals are used to designate the like parts in the patent. Where the patent employs five accumulators, there are only two required which are designated PR and MP (Fig. 1). When these accumulators are reset, they cause operation of reset contacts 270 to 274, which contacts serve the same function as the same numbered contacts in the patent. The usual impulse distributor 269 is also provided which is driven with the so-called CC cams from shaft 56 (Fig. 1). Several impulse emitters of which two are shown are driven at a 1 to 2 ratio from shaft 56. These emitters are used for different purposes as will be explained in connection with the circuit diagram.

CIRCUIT DIAGRAM

*Starting circuits.*—In setting the machine into operation, prepunched cards are first placed in the card magazine of the machine. The first operation is then to close the switch 380 (Fig. 13) providing current supply for the main driving motor Z. The motor Z drives the D. C. generator 52 (Figs. 1 and 12f) which supplies direct current to the D. C. buses 381 and 382, the latter being grounded. The start key is now depressed to close start key contacts 275 and complete a circuit from line 381, through relay magnet C, through contacts 275, through relay contacts G1 now in the position shown, through cam contacts FC2, to line 382. A stick circuit is established through the contacts C2 of the relay magnet C and cam contacts FC8, now closed. Energization of magnet C also closes relay contacts C1 and a circuit is established which is traced as follows: from line 381, through relay contacts F1, which are now in the position shown, through card feed clutch magnet 384 (see also Fig. 1), through cam contacts FC6 now closed, through relay contacts C1, stop key contacts 276 now closed, through relay contacts N1, through the punch control contacts P1, now closed, and back to line 382.

Figure 2:
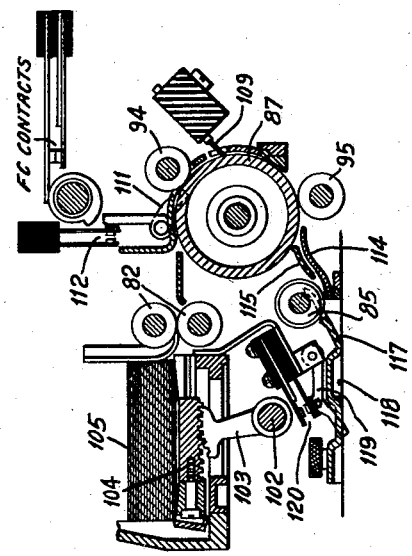
Fig. 2 is a detail of the card feeding and sensing mechanism.

In the present machine the start key must be held depressed for the first four machine cycles in starting up upon a run of cards, or alternatively it may be depressed and released and then depressed a second time. Starting is prevented until the feed rack 181 (see Patent 2,045,437, Fig. 5a) of the punch is in right hand position. This is provided for by contacts P1. The first complete card feed cycle upon starting up the machine will advance the first card to a point where the "9" index point position of the card will be about ready to pass under brushes 109 (Fig. 2). At the beginning of the second card feed cycle, the card traverses the brushes 109 and the multiplier and the multiplicand are read from the card and are entered into the MP and MC receiving devices. At the end of the first card feeding cycle, the card lever contacts 112 will be closed by the card, causing energization of relay coil H and closing relay contacts H1 (Fig. 12a). As the second card feed cycle ensues, the card is carried past the brushes and amounts are entered into the multiplicand and multiplier devices.

*Entry circuits.*—The entry circuits will now be traced. Current flows from line 381 (Fig. 12a), through relay contacts H1 now closed, through cam contacts FC7 which close at the proper time in the cycle, through the impulse distributor 259 to card transfer and contact roll 87, thence through the brushes 109 pertaining to the multiplier (these being designated 109MP on Fig. 12a), through the brushes 109MC pertaining to the multiplicand, to the plug sockets 385. The customary plug connections are provided and connected to the plug sockets 386 and 387. The entry circuits for the multiplier extend to the multiplier magnets 390MP.

These MP entry circuits are the same as usual. The MC entry circuits, instead of running to accumulator magnets, now energize relay magnets of which three are shown and designated MC$u$, MC$t$, and MC$h$ (Fig. 12a). These circuits extend from sockets 387, through wires 500. relay magnets MC$u$, MC$t$ and MC$h$, in parallel, wire 501 to ground. It will be assumed that the first card bears the amount of 73 in the multiplicand field and the amount of 4 in the multiplier field and is about to be read by the regular reading brushes 109. As a card traverses these brushes, the 4 amount is entered into the MP receiving device in the customary manner. At the "7" differential time in the sensing of the multiplicand, a circuit is completed from the contact roll 87, through the analyzing brush 109MC of the tens order, via tens order wire 500, down to and through the MC$t$ relay coil, via wire 501 to ground. The energization of magnet MC$t$ at "7" only closes relay contacts MC$t$1 and a circuit is completed from line 381, via wire 503, through the closed relay contacts MC$t$1 to emitter E$t$. At the "7" time, the brush of emitter E$t$ is contacting its "7" spot and therefore a circuit is completed to the 7M$t$ relay coil traceable from line 381, wire 503, contact MC$t$1, emitter E$t$, magnet 7M$t$, wire 501 to ground. Contacts 7M$t$1 close, providing a stick circuit for magnet 7M$t$ which is completed via wire 504, through the MP reset contacts 274, back to line 381. Coil 7M$t$ remains energized throughout computing operations. In a like manner, the 3M$u$ relay magnet in the units order and the 0M$h$ relay magnet in the hundreds order are energized and maintained in such status for the duration of the computing operations.

It may be explained that there is a manual starting up of the card feed for the first cards of a run, but that after the machine is fully in operation on subsequent cards in a run, the feed is otherwise controlled, being effected automatically. Subsequent card feed operations are initiated automatically upon and by the reset of the product accumulator. Provision is accordingly made to cut off the hand initiating control after the operations have been properly started. This is effected in the following manner. At the beginning of the second card feed cycle, the closure of cam contacts FC11 (Fig. 12f) causes relay coil G to become energized. Current flows from line 381 through magnet G, through contacts FC11, through the card lever contacts 112, now closed, and back to line 381. The energization of relay magnet G will shift the three blade relay contacts G1 to reverse position from that shown, interrupting the circuit to the start key contacts 275, but maintaining the circuit to cam contacts FC2. The energization of relay magnet G will also close relay contacts G2 and establish a stick circuit for magnets G and H, through either the FC2 contacts or the card lever contacts 112. It may be explained that the making time of cam contacts FC2 overlaps the time when the card lever contacts 112 open between cards.

The card is fed through the card handling section of the machine and ultimately it passes to the R position in the punch, closing card lever contacts 120 and energizing relay magnet F, and causing the shifting of relay contacts F1 to reverse position from that shown.

In starting up the machine, the punch racks are in extreme outer position, i. e. rack 181 is in its extreme right hand position and 182 is in its extreme left hand position (see Figs. 5 and 5a of Patent 2,045,437). Accordingly, contacts P1 are closed and contacts P2, P3 and P5 are closed. With contacts P5 closed, relay magnet K will be energized and relay contacts K1 will be closed. Upon the shifting of relay contacts F1 and upon the closure of cam contacts CC3, a circuit will be established to the punch clutch magnet 194. This circuit is completed to line 381, through the punch contacts P3, now closed, and contacts K1, which are in closed position. The energization of the punch clutch magnet 194 in the well known manner will cause closure of contacts 197 (Fig. 13) which become latched closed by latch 198. Accordingly, current supply is provided for the punch driving motor Z2. The card which has been previously read and which is in the punching unit in the R position is now advanced endwise through the punch unit to a position in which punching is to commence.

According to the present invention, the actual multiplying operation and the setup of the cycle controller is initiated by the reset of the PR accumulator. Such reset of the PR accumulator is initiated and effected in the following manner.

It has been previously explained how relay magnets F and K were energized. Energization of these two magnets closes relay contacts F2 and K2 (Fig. 12a). Upon closure of cam contacts CC6, current flows from line 381, through CC6, through relay contacts K2, through normally closed relay contacts L2, through relay contacts F2, through the 392PR reset magnet and back to ground. Energization of magnet 392PR initiates the resetting of the PR accumulator (see Fig. 1). It may be explained that resetting cannot occur until the relay contacts of K2 (Fig. 12a) are closed, which can occur only when a card is in the punch beyond the last columnar position or in starting up the machine when the punch racks are in proper position, i. e. extreme outer position. It may also be explained that relay magnet F (Fig. 12f) cannot be energized with the attendant closure of contacts F2 (Fig. 12a) until a card has reached the R position in the punch. Accordingly, reset of the PR accumulator cannot be initiated until both of these conditions are fulfilled.

During the reset of the PR accumulator, the reset contacts 272 (Figs. 1 and 12f) close and a circuit is established to relay magnet L, energizing this magnet and causing the opening of relay contacts L2 (Fig. 12a) to accordingly prevent a repetition of the reset of the PR accumulator. It may be explained that relay magnet L (Fig. 12f) is only temporarily energized by the closure of contacts 272. However, a stick circuit is established for relay magnet L, through relay contacts L1 which close upon the energization of L, the stick circuit going back to line 381, through the punch contacts P2 which are now closed. Contacts P2 remain closed until the punch rack 181 (see Fig. 5a of Patent No. 2,045,437) has completed its traverse to the left, at which time such contacts P2 open. At this time relay magnet L will become deenergized, but at such time magnets K and F will have also become deenergized. Accordingly, the circuit to the reset magnet 392PR (Fig. 12a) is completely broken, and a new reset cannot be initiated until there is a reclosure of contacts K2 and F2 following a subsequent energization of magnets K and F (Fig. 12f).

The machine is now ready to set up the cycle controller and follow with the actual multiplying operations. Upon reset of the PR accumulator a circuit is established, traced as follows: from the line 381 (Fig. 12a), through the reset contacts 270 which become closed upon reset of the PR accumulator, through relay magnets M and N to ground.

The energization of relay magnet M will close relay contacts M1 and M2. M2 establishes a stick circuit for the relay magnets M and N through the now closed reset contacts 274.

COLUMN SKIP AND CYCLE CONTROLLER

The cycle controller and zero column skipping arrangement will now be described. In the cycle controlling section of the machine, there are a number of relay magnets which will be respectively designated Yu, Yt, Yh. The suffixes u, t, h designate the related columnar orders; u designates units, t designates tens and so on. All of the Y magnets have three sets of relay contacts associated therewith. One set will be given the general suffix designation 1, the second 2, and the third set the general suffix designation 3. For example, Yu has associated with it stick relay contacts Yu1. It also has associated with it column transfer relay contacts Yu2 and column shift relay pickup contacts Yu3. A similar arrangement of relay contacts is provided for all of the various Y relays on the various columns. The "1" set of contacts are for stick circuit purposes and the "2" sets of contacts are for column transfer purposes. The CS relays are also shown on Fig. 12a, and they are respectively designated CSu, CSt, CSh. Each CS relay has a control contact pair which will be given the suffix reference numeral 3, that is, CSu3 is this extra pair of contacts which is adapted to be closed upon the energization of CSu, and so on for the other CS relays in the other columns.

If any brush of the multiplier readout MPRO stands upon a zero spot, its corresponding Y magnet will be energized. Current flows from the line 381, through the reset contacts 274, through the relay contacts M2 now closed, over wire 392, through the zero spots of the MP readout device, then via the corresponding brush or brushes standing on the zero spot or spots and then through the respective circuits shown to the respective Y magnets, and back to ground. Also connected to one side of relay contacts M2 is a line 393, which extends over and connects with one side of each of the Yu1 to Yh1 group of contacts. The other side of these contacts are wired back to their respective Y magnets and therethrough to ground. Accordingly, when any Y magnet becomes energized due to a brush standing on a zero spot in its corresponding column, the energization of this particular Y magnet will close its corresponding Y1 stick contacts and the Y magnet will remain energized through the current which flows over through line 393. It will be assumed that no zero appears on the units column of the readout, but that a zero appears on the tens column and that a significant figure appears in the hundreds column. With this condition, magnet Yt will become energized and will be held energized by its stick relay contacts Yt1. The energization of Yt will also shift contacts Yt2 to the reverse position from that shown. The stick circuit energization of the Yt magnet will maintain these contacts Yt2 shifted. Yu2 will not have been shifted because its corresponding magnet Yu had not been energized. The same will also apply to the Yu2 contacts.

The machine is now ready to multiply by the amount in the units order of the multiplier. Initiation of multiplication is effected in the following manner. Upon energization of relay magnet M, relay contacts M1 (Fig. 12a) close and, upon closure of cam contacts CC6, a circuit is completed from line 381, through the cam contacts CC6 and relay contacts M1, via wire 505, to and through the non-shifted Yu2 contacts, to the units order common segment of MPRO, via the brush standing at "4," via wire 506, to and through the 4X relay magnet and back to ground. The energization of relay magnet 4X closes its contacts 4X1 to provide a stick circuit for this magnet which extends back to line 381 via line 507 and cam contacts CC7. Concurrently with such energization of relay magnet 4X, a branch circuit extends from the M1 relay contacts to and through the non-shifted Yu3 contacts, through the column shift relay magnet CSu and back to ground. Summarizing, near the end of the cycle in which the product accumulator is reset, the relay magnets 4X and CSu are energized as has just been described.

Relay magnet CSu closes its contacts CSu1 which establishes a holding circuit from line 381, cam contacts CC7, contacts CSu1, relay magnet CSu to ground. The magnet CSu also closes a pair of contacts CSu3 paralleling contacts Yu1 to set up a circuit from line 381, contacts 274 and M2, cam contacts CC8, contacts CSu3, relay magnet Yu to ground. The closure of contacts CC8 takes place in the following cycle (see also Fig. 3) and upon such closure magnet Yu is energized, closing its stick circuit contacts Yu1 and shifting its contacts Yu2 and Yu3, so that when contacts CC6 next close (with zero assumed to be standing on the tens order of MPRO), the circuits completed will energize magnet CSh and pass through the brush in the hundreds order position of the MPRO device.

*First multiplying operation.*—As stated, upon the first closure of contacts CC6, magnet 4X is energized in accordance with the entry of a digit 4 in the units order of MPRO. Magnet CSu is also energized at the same time. If the units multiplier digit were something other than 4, another one of the magnets IX to 9X would have been energized and a holding circuit established therefor through its related contacts IXI to 9XI. If the digit is 6, 7, 8 or 9, a relay magnet designated AA is also energized. The function of this magnet will be subsequently explained. In Fig. 12a are shown five relay magnets which are designated 1,9XX, 2,8XX, 3,7XX, 4,6XX and 5XX. Magnet 1,9XX is energized whenever either the IX or 9X magnets is energized. The 2,8XX magnet is energized whenever the 2X or 8X magnets are energized and so on. The function of these magnets will also be explained subsequently.

MECHANISM FOR PREDETERMINING LEFT HAND COMPONENTS

In Fig. 12b are represented eight sets or groups of contacts, each controlled by one of the magnets 2X to 9X which are closed upon energization of the related magnet. There are also shown three sets of contacts identified as related to the units order, tens order and hundreds order of the multiplicand. As explained above, there are provided for the units order ten magnets 0Mu to 9Mu (Fig. 12a) which are selectively energized in accordance with the digit in that order of the multiplicand. For each of the magnets 2Mu to 9Mu there are four contacts designated 2Mu2—5, 3Mu2—5, etc. (Fig. 12b). Similar sets of contacts are provided for the tens and hundreds order multiplicand relay magnets. Thus, for example, where the multiplicand 73 is represented by energization of magnets 7Mt and 3Mu (Fig. 12a), the four contacts designated 3Mu2—5 of Fig. 12b and the set of four contacts designated 7Mt2—5 are closed when their respective magnets 3Mu and 7Mt are energized.

The contacts of the magnets 2X, 3X etc. of Fig. 12b are connected to four groups of wires designated 510 (1), 510 (2), 510 (3) and 510 (4). These groups of wires extend over to the first, second, third and fourth vertical rows of multiplicand contacts in the three orders, respectively. Each of the four vertical rows of contacts in each order are connected through wires designated generally 511 to a group of four magnets associated with the next higher order. For example, the wires 511 connected to the four magnets associated with the tens order which are designated 1t, 2t, 3t and 4t.

When any digit from 2 to 5 is set on the multiplier contacts and any digit from 3 to 9 is set in an order of the multiplicand, circuit connections are completed to the set of four magnets of the next higher order in accordance with the left hand component of the product of such two digits. For example, if the multiplicand digit in the units order is 3 and the multiplier digit is 4, the magnet 1t will be energized since 1 represents the left hand component of the product 12. If the units digit were 5 and the multiplier digit 4, the magnet 2t would be energized, this representing the left hand component of the product 20. For the multiplier digits 6 to 9 inclusive, the selection of the magnets in the groups of four is made in accordance with the true or tens complement of the left hand components. For example, if the units multiplicand digit were 4 and the multiplier digit were 6, the magnets 1t, 3t and 4t would be energized, the sum of 4, 3 and 1 being 8 which is the tens complement of the left hand component of the product 24.

The following Table I shows which of the sets of four magnets is energized for the various components of digits that may be multiplied, and the circuit connections shown in Fig. 12b will result in the energization of one or more of the four magnets in each set.

TABLE I

| MP digits | MC digits | | | | | | | | |
|---|---|---|---|---|---|---|---|---|---|
|  | 1 | 2 | 3 | 4 | 5 | 6 | 7 | 8 | 9 |
| 2 |  |  |  |  | 1 | 1 | 1 | 1 | 1 |
| 3 |  |  |  | 1 | 1 | 1 | 2 | 2 | 2 |
| 4 |  |  | 1 | 1 | 2 | 2 | 2 | 3 | 3 |
| 5 |  |  | 1 | 2 | 2 | 3 | 3 | 4 | 4 |
| 6 |  | 2,3,4 | 2,3,4 | 1,3,4 | 3,4 | 3,4 | 2,4 | 2,4 | 1,4 |
| 7 |  | 2,3,4 | 1,3,4 | 1,3,4 | 3,4 | 2,4 | 2,4 | 1,4 | 4 |
| 8 |  | 2,3,4 | 1,3,4 | 3,4 | 2,4 | 2,4 | 1,4 | 4 | 3 |
| 9 |  | 2,3,4 | 1,3,4 | 3,4 | 2,4 | 1,4 | 4 | 3 | 2 |

Figure 3:
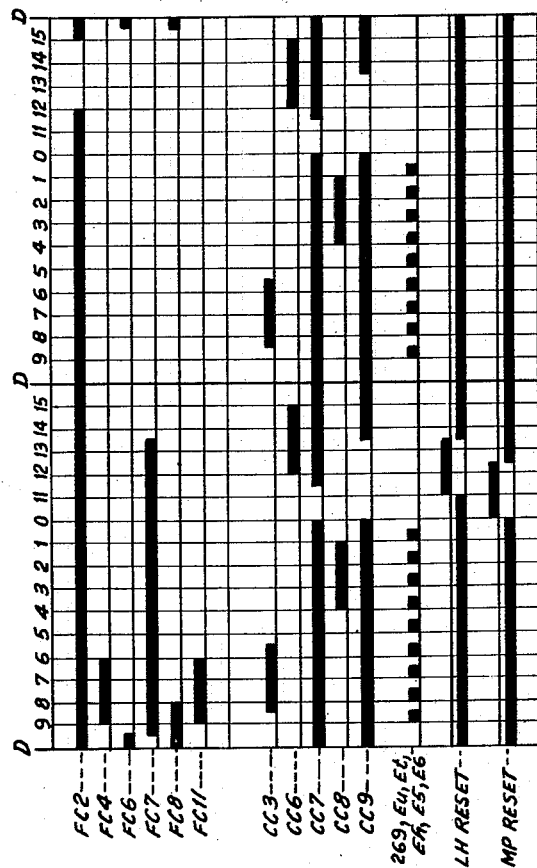
Fig. 3 is a timing chart of certain of the circuit controlling devices in the machine.

Accordingly, tracing the circuits for a particular pair of digits, for example, a units multiplicand digit of 3 and a multiplier digit of 4, a circuit is completed upon closure of cam contacts CC9 (Fig. 12c) from line 381, contacts CC9, wire 508 (Fig. 12b), wire 509, the top pair of contacts of the 4X3 group, the number 3 wire of the group 510 (1), contacts 3Mu5 in the column farthest to the right, the lowermost wire 511, magnet 1t and thence to ground. This circuit is emphasized on the diagram. Similarly, with the digit 7 in the tens order of the multiplicand, a second circuit is completed from line 381, contacts CC9 (Fig. 12c), wires 508 (Fig. 12b), 509 to the fifth contact 4X3 from the top of the 4X3 group, the 7 wire of the group 510 (2), contacts 7Mt3, the second wire 511 from the bottom, magnet 2h, and thence to ground. Thus, for the example 73×4 chosen, magnets 1t and 2h are energized at the time contacts CC9 close which, as indicated in Fig. 3, takes place prior to the multiplying cycle.

To trace a further circuit, assuming the multiplicand digit were 3 and the multiplier digit were 7, the four contacts 3Mu2-5 are closed and the 7X3 group of multiplier contacts is closed. When contacts CC9 (Fig. 12c) close, circuits will be traceable from wire 509 (Fig. 12b) to the fourth, fifth and sixth contacts of the 7XX group to the number 3 wires in each of the groups 510 (1), 510 (3), and 510 (4), these circuits continuing through the contacts 3Mu2, 3Mu3 and 3Mu5, through the magnets 1t, 3t, 4t to ground. It is to be noted that only four magnets t, h or th are employed to represent the left hand components and that, when the multiplier digit is from 1 to 5, the magnet energized represents, directly, the value of the left hand digit such as 1, 2, 3 or 4 (see Table I). Where the multiplier digit is 6 to 9, the four magnets are energized in accordance with the tens complement of the left hand digit of the product as, for example, in the last example given for 3×7=21 the magnets 1t, 3t and 4t are energized, 1+3+4 equaling 8 which is the tens complement of 2 the left hand component of 21.

The four magnets of each order accordingly provide a convenient combinational setting to represent in true form, for the multiplier digits 2 to 5 and the tens complementary form, for the digits 6 to 9 the value of the left hand components of the products of pairs of digits. The arrangement in Fig. 12b might be called a mechanism for determining left hand component products of the two amounts. The manner in which these groups of magnets control the product entering circuits will be explained later.

In order to more clearly explain the principle of operation, the circuits involved in the multiplication of two digits whose product does not involve a left hand component will first be explained. Let us consider two such digits as a multiplicand of 2 and a multiplier of 3 whose product is 6.

Figure 12E:
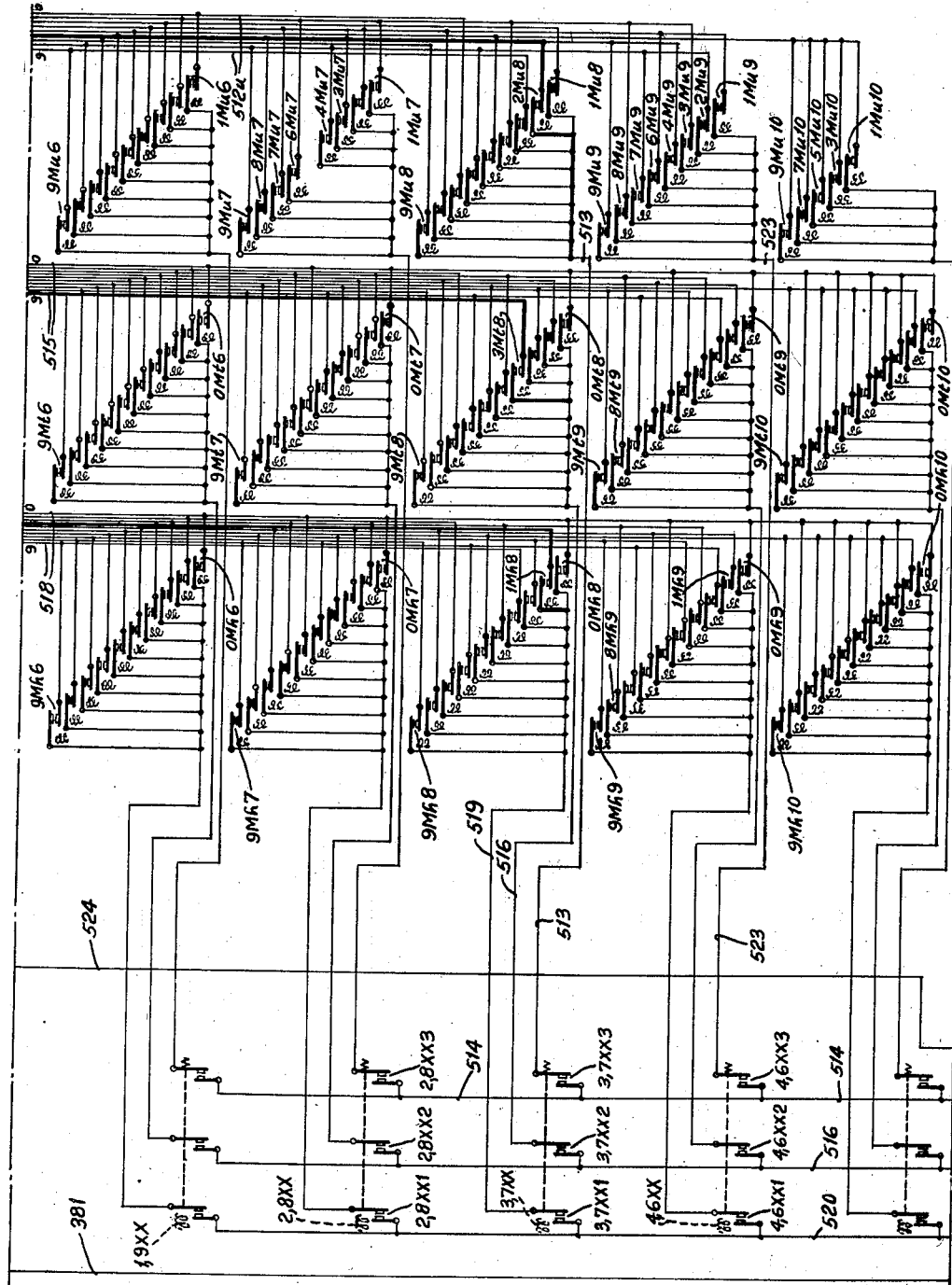

Referring to Fig. 12e, the multiplicand magnets in the units order control sets of contacts which are given the suffixes 6, 7, 8, 9 and 10 and which are grouped as shown. The units order contacts are connected to a group of wires designated 512u which extend upwardly across Fig. 12d to Fig. 12c where they connect to the segments of an emitter generally designated E5 which has its common conductor connected through wire 521 and normally closed contacts AA3 to line 381. During the rotation of the brush of emitter E5, impulses will be sent through the group of wires 512u in the order "9," "8," "7," etc. in synchronism with the operation of the accumulating wheels of the PR accumulator. At the "6" time in the cycle, that is, at the time when the energization of the accumulating magnet of the PR accumulator will enter 6, a circuit will be completed which is traceable from line 381 (Fig. 12c), through the closed contacts AA3, the sixth segment of emitter E5, the "6" wire of the 512u group (Figs. 12d and 12e), contacts 2Mu8, wire 513, contacts 3,7XX3, wire 514 (Fig. 12f), contacts CSu2 (now closed) to the units order accumulating magnet 390PR and thence to ground. A "6" will accordingly be entered into the accumulator.

With a multiplicand such as 132 and a multiplier 3, similar circuits would be completed to enter the product 396 in accumulator PR. The circuit for entering the 6 has already been traced. The circuit for entering the 9 would be from the 9 segment of emitter E5 (Fig. 12c) to the 9 wire of group 512u, 9 wire of the set of wires designated 512t (see Fig. 12d), thence through a series of normally closed contacts, which will be more fully explained later, to the 9 wire of the group designated 515 (Fig. 12e), contacts 3Mt8, wire 516, contacts 3,7XX2, wire 516 (Fig. 12f), contacts CSt2, to the tens order magnet 390PR and to ground. During the same cycle, the circuit is traceable at the 3 time from the 3 segment of emitter E5 (Fig. 12c), to the 3 wire of a group designated 512h, down through a series of normally closed contacts (Figs. 12c and 12d) to the 3 wire of the group designated 518 (Fig. 12e), contacts 1Mh8, wire 519, contacts 3,7XX1, wire 520 (Fig. 12f), contacts CSt2, the hundreds order magnet 390PR. The three circuits through which the product 396 is entered in the PR accumulator during the cycle are emphasized on the circuit diagram (Fig. 12e).

It will be noted that the problem chosen does not involve any carries and the multiplier digit chosen was less than 6. Where the multiplier digit is 6 or more, the circuits are controlled from the minus emitter E6 (Fig. 12c) instead of emitter E5. As pointed out in connection with Fig. 12a, whenever a multiplier digit is 6 or greater, the relay magnet AA is energized along with the appropriate multiplying relay 6X to 9X. Magnet AA shifts its contacts AA3 (lower left hand corner of Fig. 12e), to break the connection 521 between emitter E5 and line 381, and to connect the common segment of emitter E6 to the line through the wire 522. This emitter will send impulses to the groups of wires 512u, 512t and 512h in inverted order.

The wiring arrangement takes advantage of the fact that the right hand components of products when the multipliers are 6, 7, 8 and 9 are true complements of the right hand components when the multipliers are 4, 3, 2 and 1. Hence, in Fig. 12e only five groups of contacts suffixed 6, 7, 8, 9 and 10 for each column are required instead of nine groups of contacts per column, which would otherwise be required if advantage were not taken of the mathematical pattern just set forth.

To trace the circuits for a specific multiplier, let us say a multiplier of 6, and assuming a multiplicand of 2, relay magnet 6X and AA will be first energized as explained (Fig. 12a). The right hand component of the product 12 in this case is 2. Accordingly, at the "2" entering time in the cycle, a circuit is traceable from line 381 (Fig. 12c), upper contacts AA3 now closed, wire 522, emitter E6, its 2 segment to the 8 wire of the group 512u (Figs. 12d and 12e), contacts 2Mu9 now closed, wire 523, contacts 4,6XX3 to wire 514 and thence through contacts CSu2 to the units order magnet 390PR (Fig. 12f). If the multiplier in this case had been 4 instead of 6, the circuit would have been the same except that instead of going through the emitter E6, it would have gone through emitter E5 at the "8" time in the cycle.

COMBINING LEFT HAND COMPONENTS WITH HIGHER ORDER RIGHT HAND COMPONENTS

In the orders higher than units, the circuits which will normally be completed in such orders will be altered or "advanced" so that, for example, if the tens order of the right hand component is, let us say, 6, and the left hand component of the units order is 2, the circuit in the tens order instead of traversing wiring to enter a 6 would be routed or advanced to enter an 8. In prior machines the left and right hand components have been separately attained and separately accumulated, and as a final step in the calculation, the left hand and right hand components were added together in proper columnar relationship. The present arrangement differs in that the left and right hand components involved in the multiplication of a multiplicand by any digit are in effect merged to cause a single entry to be made into a single accumulator, this entry representing the product of the multiplicand times the digit of the multiplier.

Referring to Fig. 12b, it will be recalled that the left hand components are determined by the circuit arrangement in this figure and the digits are represented in combinations of four on the sets of four magnets shown at the bottom of the figure. These sets of four magnets control contacts shown in Fig. 12d and the contacts are wired in the entering circuits as shown.

Considering the tens order section where these contacts are inserted between the wires 512t in the upper part of Fig. 12d and the wires 515 at the lower part of Fig. 12d, where the multiplication of the units digit of the multiplicand does not involve a left hand component the contacts remain in the position shown, so that the circuit from any wire in the 512t group continues through the similar wire in the 515 group, as has already been explained. Assuming that the left hand component of the units digit were 1, the magnet 1t would be energized and its contacts 1t1 to 1t10 shifted. This has the effect of causing a 1 digit displacement between the group of wires 512t and the group of 515. Graphically, the normal relationship might be illustrated as follows:

```
Wires 512t _____ 9 8 7 6 5 4 3 2 1
Wires 515  _____ 9 8 7 6 5 4 3 2 1
``` and a 1 digit displacement would change the relationship as follows:

```
Wires 512t _____   9 8 7 6 5 4 3 2 1
Wires 515  _____ 9 8 7 6 5 4 3 2 1 0
```

If magnet 2t were energized, the displacement would be:

```
Wires 512t _____   9 8 7 6 5 4 3 2 1
Wires 515  _____ 8 7 6 5 4 3 2 1 0 9
```

With magnet 3t energized, the displacement would be:

```
Wires 512t _____   9 8 7 6 5 4 3 2 1
Wires 515  _____ 7 6 5 4 3 2 1 0 9 8
``` and with magnet 4t energized, the displacement would be:

```
Wires 512t _____   9 8 7 6 5 4 3 2 1
Wires 515  _____ 6 5 4 3 2 1 0 9 8 7
```

With the use of the set of four combinational magnets 1t to 4t, the maximum displacement can be obtained without resorting to more sets of contacts, for example, take the extreme case of a left hand digit of 8, in which case the 4, 3 and 1 magnets would be energized and the resulting relationship between the wires 512t and 515 might be represented as follows:

```
Wires 512t _____   9 8 7 6 5 4 3 2 1
Wires 515  _____ 2 1 0 9 8 7 6 5 4 3
```

On the circuit diagram (Fig. 12d) there is emphasized by dotted lines the circuit path between the two groups of wires. The right hand component of one has its wiring advanced eight steps so that the impulse will be transmitted at the "9" time for multipliers 1 to 5 or the "1" time for multipliers 6 to 9 to transmit the circuit to the 1 wire of the 515 group.

The arrangement is exactly the same in the hundreds order and also the thousands order, the number of contacts required in the thousands order being confined to a single wire 524, as this order only receives left hand components or carry entries from the lower orders.

Fig. 9 illustrates diagrammatically a problem in which no tens carry operations are involved which indicates that the 8 in the tens order is obtained by the combining of the left hand component 2 and the right hand component 6, so that a single entry of 8 is made in the tens order of the product accumulator.

TENS CARRY CONTROL CIRCUITS

Fig. 10 illustrates a problem in which there is a tens carry from the tens to the hundreds order, and it is indicated that this additional digit is combined with the left hand component 3 so that a 4 is directly entered in the hundreds order of the product accumulator. For controlling the entry of an additional unit into the hundreds order, there are provided two sets of contacts designated +1Ah1—10 at the top of Fig. 12d and a second set of contacts designated —1Ah1—9 at the bottom of Fig. 12c. The first set of contacts is controlled by a relay magnet +1Ah and the second set by a relay magnet designated —1Ah (Fig. 12c). The first set is shifted when the multiplier digit is from 1 to 5 and a carry is to be effected while the second set is shifted if the multiplier digit is 6 to 9 when the carry is to be effected, and the wiring is such that when shifting is effected in either set, the impulses from either of the emitters E5 and E6 going through wires 512h will be advanced one unit higher.

The manner in which the magnets —1Ah and +1Ah are controlled will now be explained. Referring to Fig. 12a, there is shown a series of magnets designated 3XAt, 4XAt, 6XAt, 7XAt, 8XAt and 9XAt. These magnets are connected in parallel through a group of wires designated 625 with the magnets 3X, 4X, 6X, 7X, 8X and 9X respectively, so that when any of the latter magnets is energized, the corresponding XAh and XAt magnets are energized concurrently therewith. These magnets control sets of contacts shown in Fig. 12c which are identified with the reference character of the magnet followed by the suffix 1.

As already explained, when a multiplicand amount is entered, the Mu and Mt relay magnets of Fig. 12a are energized in accordance with the value of the units and tens digit of the multiplicand. The Mu magnets close contacts suffixed with the numeral 11 in the lower right hand part of Fig. 12c, and the Mt magnets close contacts suffixed 12 in the tens section of Fig. 12c. Upon closure of cam contacts CC9, a circuit is traceable from line 381 (Fig. 12c) through cam contacts CC9, wire 526, through the closed Mu contacts to one of the magnets generally designated Cu which may be termed a carry determining magnet. For example, if contacts 9Mu11 were closed, the circuit would energize relay 9Cu causing closure of its contacts 9Cu1 so that the next magnet 8Cu will be energized, which will in turn close its contacts 8Cu1 to energize magnet 7Cu and so on down the line to effect energization of all the Cu magnets related to lower digits. Thus, when any Cu magnet is initially energized, it will also bring about energization of all other Cu magnets of lower digital designation. Each Cu magnet also causes closure of a pair of contacts designated with the suffix 2. These contacts have common connection with the wire 526 and are also individually connected through a group of wires 527 to the XAt1 contacts as shown.

Referring to Figs. 6 and 7, there is given a table of two-place amounts representing all the possible two-digit numbers for which a carry is required when these numbers are multiplied by the designated multiplier digits. For example, the first number shown is 34. When this is multiplied by 3, a carry into the hundreds order results.

The wiring connections to the XAt1 contacts (Fig.12c) are arranged so that, when a tens order digit is represented on the Mt12 contacts, the units order digit is represented on the Mu11 contacts and a multiplier is represented on the XAt1 contacts, a circuit will be completed when for any of the six multipliers designated in Figs. 6 and 7 the multiplicand amount appears in the group of numbers under the designated multiplier digit. Taking, for example, the problem of Fig. 10 where the multiplier is 6 and the multiplicand is 67, accordingly, contacts 7Mu11, 6Mu12 and 6XAt1 (Fig. 12c) are closed. Upon closure of cam contacts CC9, carry control magnets 7Cu to 2Cu are energized so that the contacts 7Cu2 to 2Cu2 are also closed. A circuit is thereupon traceable from line 381, contacts CC9, wire 526, contacts 4Cu2, the 4 wire of group 527, the lowermost contacts 6XAt1, contacts 6Mt12, wire 528, to contacts designated AA2. These contacts are controlled by the relay magnet AA2 which, as already explained, is energized whenever the multiplier digit is 6 or more. Accordingly, contacts AA2 are in shifted position so that the circuit continues through wire 529 to magnet —1Ah, and thence to ground.

According to the previous explanation, the circuits have already been adjusted to send a "3" impulse from the minus emitter E6 to the hundreds order magnet 390PR of the product accumulator. Energization of magnet —1Ah will shifts its contacts 1Ah1—9 so that the hundreds order accumulator magnet will be connected to receive an entering impulse one index point sooner to enter a 4 instead of 3.

If the multiplier digit had been less than 6, magnet AA would be deenergized and the circuit from wire 528 would have continued through normally closed contacts AA2 through wire 530 to energize magnet +1Ah, and any impulse from the plus emitter E5 would be advanced one digit.

The contact arrangement and circuits just explained constitute in effect a device for examining or inspecting the units and tens digits of a multiplicand to determine whether, when multiplied by various multipliers, a digit is to be carried over into the hundreds order.

A somewhat similar arrangement is provided in the next higher or thousands order, in which a set of contacts designated —1Ath1—9 controlled by a magnet —1Ath and a second set of contacts designated +1Ath1—10 controlled by a magnet +1Ath are connected in the wires 531 extending to the emitters E5 and E6. These sets of contacts, when shifted by their related magnets, will advance the connections one digit in the same manner as the advance is effected in the hundreds order. Such advance in the thousands order would be the result of what might be called a "carry on a carry" as illustrated in Fig. 11, where there is represented a carry tens over into the hundreds order which in turn requires a further carry into the thousands order. The table in Fig. 8 represents the digital settings to which the further carry should take place, these settings being dependent upon the setting of the units and tens orders in accordance with the digits represented in Figs. 6 and 7. Thus, for example, in Fig. 8 under the heading MP—6 we find a number 16 which indicates that from any number such as 167 to 169 there will be a double carry when multiplying by 6.

Referring to Fig. 12a, a set of magnets designated generally XAh are energized in accordance with the multiplier digit through circuits from wires 525 paralleling the XAt magnets and the X magnets. These XAh magnets close the contacts shown in the hundreds order section of Fig. 12c. A set of contacts designated Mt11 are closed under control of the Mt magnets in Fig. 12a in accordance with the tens digit of the multiplicand, and these cause energization of magnets designated Ct in the same manner as the Cu magnets are energized under control of the units order digit of the multiplicand. The circuit extends from line 381, contacts CC9, wire 526, wire 532, the appropriate Mt11 contacts and thence in parallel through a related Ct magnet and Ct magnets of lower digital value, resulting in the closure of the appropriate contacts designated Ct2.

A group of contacts designated Mh12 are closed under control of the Mh magnets to represent the hundreds order digit of the multiplicand. Through the group of wires 533 connected between the Ct2 contacts and the XAh contacts circuits will be completed in accordance with the settings represented in Figs. 6 and 7, such circuits being traceable from line 381, contacts CC9, wire 526, wire 532, one of the Ct2 contacts, wire 533, one of the XAh1 groups of contacts, one of the Mh12 contacts, wire 534, one or the other of the AA1 contacts through wires 535 or 536 to magnet —1Ath or +1Ath. These circuit connections are the same as for controlling the magnets —1Ah and +1Ah and serve to determine with relation to the tens and hundreds order whether there is to be a straight carry into the thousands order.

*Carry on carry.*—The XAh magnets also close sets of contacts designated XAh2 which are connected to contacts designated Mh13 and a set or contacts designated Mt13 which are settable in accordance with the hundreds and tens digits respectively of the multiplicand. With this arrangement, whenever a circuit is completed under control of the digits in the hundreds and tens order extending through the wire 528 as previously traced, a branch circuit through wire 537 will extend from the Mt12 contacts, through one of the Mt13 contacts, a group of wires 538 to one of the sets of XAh2 contacts, thence through one of the Mh13 contacts and through wire 534 to energize one or the other of the 1Ath magnets.

Taking the specific example of Fig. 11 where the units order contacts are set at 7 and the tens order at 6, a circuit is completed to energize the —1Ah magnet to advance the tens order product digit one unit. This circuit goes through wire 528. The branch circuit through wire 537 will go through the contacts 6Mt13, the 6 wire of group 538, through the left hand one of the group of contacts 6XAh2, which is now closed in accordance with the multiplier of 6, contacts 1Mh13 now closed in accordance with the hundreds multiplicand digit 1 to wire 534, through contacts AA1, now shifted, to energize the magnet —1Ath.

It will be noted that there are two possible circuits to energize the two thousands order carry control magnets and that either one or none will be completed, depending upon the initial digital values of the multiplicand orders.

PROBLEM

The entire sequence of operations involved in obtaining a complete product of two factors will now be reviewed in connection with a problem which may be stated as follows:

$$889 \times 496 = 440944$$

As the record card containing the multiplicand 889 and the multiplier 496 traverses the sensing brushes, these two amounts are read from the card and entered into their respective entry receiving devices in a manner described previously. The amount 496 is set up in the MPRO device (Fig. 12a). The multiplicand is set up by energization of relay magnets 8Mh, 8Mt, and 9Mu. Energization of these relay magnets results in the closure of the following related contacts which remain closed throughout all subsequent multiplying operations for the card.

| 8M$h$2–5 | 8M$t$2–5 | 9M$u$2–5 |
|---|---|---|
| 8M$h$6–10 | 8M$t$6–10 | 9M$u$6–10 |
| 8M$h$12 | 8M$t$11 | 9M$u$11 |
| 8M$h$13 | 8M$t$12 | |
| | 8M$t$13 | |

*First multiplying cycle.*—Just before the first multiplying cycle takes place, cam contacts CC6 (Fig. 12a) close and as a result the following magnets are energized and their related contacts closed as indicated:

| Magnets | Contacts |
|---|---|
| 6X | 6X3 |
| AA | AA1–3 |
| 6XA$h$ | 6XA$h$1–2 |
| 6XA$t$ | 6XA$t$1 |
| CS$u$ | CS$u$1–3 |

These magnets are held energized through the cam contacts CC7 throughout the multiplying cycle. Also, before multiplying commences, cam contacts CC9 (Fig. 12c) close and as a result magnet 4,6XX (Fig. 12a) is energized and closes its contacts 4,6XX1–3 (Fig. 12e). With the above mentioned magnets energized, the left hand component determining magnets are energized upon the closure of contacts CC9 through the sets of contacts as indicated.

| Magnet | Through contacts |
|---|---|
| 1$t$,4$t$ | 6X3 and 9M$u$2–5 |
| 2$h$,4$h$ | 6X3 and 8M$t$2–5 |
| 2$th$,4$th$ | 6X3 and 8M$h$2–5 |

Also, when cam contacts CC9 close, the following magnets are energized through the contacts indicated.

| Magnet | Through contacts |
|---|---|
| 9–2C$u$ | 9M$u$11 |
| 8–2C$t$ | 8M$t$11 |

Since the units order digit of the multiplicand is 9, the tens order digit is 8 and the multiplier is 6, we see from Fig. 6 that a carry is required in the hundreds order and, since the tens and hundreds orders of the multiplicand are both 8 with a multiplier of 6, we find that a tens carry is also required in the thousands order. The following magnets are accordingly energized through the contacts indicated:

| Magnet | Through contacts |
|---|---|
| –1A$h$ | 4C$u$2, 6XA$t$1, 8M$t$12, AA2 |
| –1A$th$ | 4C$t$2, 6XA$h$, 8M$h$12, AA1 |

The several magnets listed above are accordingly energized before the emitters begin to send impulses to the entering magnets of the product accumulator. As the emitter E6 now rotates, impulses representing the product 5334 will be transmitted to the product accumulator, entering therein the complete product of the multiplicand times the units digit of the multiplier.

The four circuit paths through which these timed impulses pass will now be traced.

*Entering 4 in the units order of PR accumulator.*—From line 381 (Fig. 12c), upper contacts AA3, wire 522, emitter E6 at the "4" time, 6 wire 512$u$ (Figs. 12d and 12e), contacts 9M$u$9, wire 523, contacts 4,6XX3, wire 514 (Fig. 12f), contacts CS$u$2, to the units order magnet 390PR.

*Entering 3 in the tens order of PR accumulator.*—From line 381 (Fig. 12c), upper contacts AA3, wire 522, emitter E6 at the "3" time, the 7 wire 512$t$ (Fig. 12d), left hand contacts 4$t$3, right hand contacts 3$t$7, right hand contacts 2$t$6, left hand contacts 1$t$7, 2 wire 515 (Fig. 12e), contacts 8M$t$9, contacts 4,6XX2, wire 516 (Fig. 12f), contacts CS$u$2 to the tens order magnet 390PR.

*Entering 3 in the hundreds order of PR accumulator.*—From line 381 (Fig. 12c), upper contacts AA3, emitter E6 at the "3" time, 7 wire 512$h$, left hand contacts –1A$h$3, right hand contacts +1A$h$2 (Fig. 12d), left hand contacts 4$h$2, right hand contacts 3$h$6, left hand contacts 2$h$6, right hand contacts 1$h$8, 2 wire 518 (Fig. 12e), contacts 8M$h$9, contacts 4,6XX1, wire 520 (Fig. 12f), contacts CS$u$2 to the hundreds order magnet 390PR.

*Entering 5 in the thousands order of PR accumulator.*—From line 381 (Fig. 12c), upper contacts AA3, emitter E6 at the "5" time, 5 wire 531, left hand contacts –1A$th$5, right hand contacts +1A$th$6 (Fig. 12d), contacts 4$th$5, contacts 3$th$4, contacts 2$th$1, contacts 1$th$2, wire 524 (Fig. 12f), contacts CS$u$2, to the thousands order magnet 390PR.

During the operation of the emitters, cam contacts CC8 close (see Fig. 3) to cause energization of relay magnet Y$u$ (Fig. 12a), through a circuit from line 381, contacts 274, M2, CC8, CS$u$3, magnet Y$u$ to ground. Magnet Y$u$ closes its contacts Y$u$1 to provide a holding circuit and shifts its contacts Y$u$2 and Y$u$3 so that, toward the end of the first multiplying cycle when cam contacts CC6 again close, the following magnets will be energized together with their related contacts as follows:

| Magnet | Contacts |
|---|---|
| 9X | 9X3 |
| AA | AA1–3 |
| 9XA$h$ | 9XA$h$1–2 |
| 9XA$t$ | 9XA$t$1 |
| CS$t$ | CS$t$1–3 |

When contacts CC9 now close, the following magnets will be energized through the contacts indicated.

| Magnet | Through contacts |
|---|---|
| 1,9XX | 9X2 |
| 2$t$ | 9X3 and 9M$u$2–5 |
| 3$h$ | 9X3 and 8M$t$2–5 |
| 3$th$ | 9X3 and 8M$h$2–5 |
| 9–2C$u$ | 9M$u$11 |
| 8–2C$t$ | 8M$t$11 |
| –1A$h$ | 9C$u$2, 9XA$t$1, 8M$t$12, AA2 |
| –1A$th$ | 9C$u$2, 9XA$t$1, 8M$t$12, 8M$t$13, 9XA$h$2, 8M$h$13, AA1 |

With the above identified magnets energized, the product of 889 times the multiplier digit 9, which is 8001, will now be entered and the circuits therefor will be traced.

*Entering 1 in the tens order of PR accumulator.*—From line 381 (Fig. 12c), upper contacts AA3, emitter E6 at the "1" time, 9 wire 512u (Figs. 12d and 12e), contacts 9Mu6, contacts 1,9XX3, wire 514 (Fig. 12f), contacts CSt2 to the tens order magnet 390PR. No entries are made in the hundreds and thousands order of accumulator PR as the digits for both these orders are zero.

*Entering 8 in the tens of thousands order of PR accumulator.*—From line 381 (Fig. 12c), upper contacts AA3, emitter E6 at the "8" time, the 2 wire 531, left hand contacts —1Ath8, right hand contacts +1Ath7 (Fig. 12d), contacts 4th7, contacts 3th3, contacts 2th3, contacts 1th2, wire 524 (Fig. 12f), contacts CSt2, to the tens of thousands order magnet 390PR. During the entry of this product, cam contacts CC8 (Fig. 12a) again close to energize magnet Yt which shifts its contacts so that toward the end of this second multiplying cycle, when contacts CC6 again close, the following magnets will be energized.

| Magnets | Contacts |
|---|---|
| 4X | 4X3 |
| 4XAh | 4XAh1–3 |
| 4XAt | 4XAt1 |
| CSh | CSh1–3 |

It will be noted that this time the magnet AA is not energized. When cam contacts CC9 close, the following magnets are energized through the contacts designated.

| Magnets | Contacts |
|---|---|
| 4,6XX | 4X2 |
| 3t | 4X3 and 9Mu2–5 |
| 3h | 4X3 and 8Mt2–5 |
| 3th | 4X3 and 8Mh |

This time there will be no circuit completed through the Ah or Ath magnets, and as the emitter E5 now sends out impulses, the product of 889 times 4 which is 3556 will be entered into the appropriate orders of the PR accumulator through circuits traced as follows.

*Entering 6 in the hundreds order of PR accumulator.*—From line 381 (Fig. 12c), lower contacts AA3, emitter E5 at the "6" time, the 6 wire 512u (Figs. 12d and 12e), contacts 9Mu9, contacts 4,6XX3, wire 514 (Fig. 12f), contacts CSh2 to the hundreds order magnet 390PR.

*Entering 5 in the thousands order of PR Accumulator.*—From line 381 (Fig. 12c), lower contacts AA3, emitter E5 at the "5" time, the 5 wire 512t (Fig. 12d), right hand contacts 4t5, left hand contacts 3t5, right hand contacts 2t8, right hand contacts 1t8, 2 wire 515 (Fig. 12e), contacts 8Mt9, contacts 4,6XX2, wire 516 (Fig. 12f), contacts CSh2, to the thousands order magnet 390PR.

*Entering 5 in the tens of thousands order of PR accumulator.*—From line 381 (Fig. 12c), lower contacts AA3, emitter E5 at the "5" time, 5 wire 512h, right hand contacts —1Ah5, right hand contacts +1Ah5 (Fig. 12d), right hand contacts 4h5, left hand contacts 3h5, right hand contacts 2h8, right hand contacts 1h8, the 2 wire 518 (Fig. 12e), contacts 8Mh9, contacts 4,6XX1, wire 520 (Fig. 12f), contacts CSh2, to the tens of thousands order magnet 390PR.

*Entering 3 in the hundreds of thousands order of PR accumulator.*—From line 381 (Fig. 12c), lower contacts AA3, emitter E5 at the "3" time, 3 wire 531, right hand contacts —1Ath7, right hand contacts +1Ath7 (Fig. 12d), contacts 4th7, contacts 3th3, contacts 2th3, contacts 1th2, wire 524 (Fig. 12f), contacts CSh2, to the hundreds of thousands order magnet PR.

At the completion of the third multiplying cycle, the complete product stands in the PR accumulator. The steps in this multiplication are graphically illustrated in Fig. 4, indicating that the complete product for the 3 multiplier digits are entered in successive cycles resulting in the complete product 440944. Fig. 5 shows the condition where one of the multiplier digits is zero, in which case there is no multiplying cycle for the zero digit, this being eliminated by the operation of the cycle controlling device in the usual manner.

RESETTING THE MP AND MC DEVICES

During the last multiplying cycle, when contacts CC8 (Fig. 12a) close to energize magnet Yh, a circuit will be established so that upon the subsequent closure of contacts CC6, the MP reset magnet 392MP is energized through a circuit traceable from line 381, contacts CC6, contacts M1, in series through the shifted Yu2, Yt2 and Yh2 contacts, magnet 392MP to ground. As a result, the MP accumulator is mechanically reset and in doing so contacts 274 open to break the holding circuit for the M and N relay magnets as well as the holding circuits for the Mu, Mt and Mh magnets. The reset of the MP accumulator also brings about the closure of contacts 273 (Fig. 12f) which causes energization of relay magnet C. The energization of magnet C causes closure of contacts C1 and there is reinitiated energization of card feed clutch magnet 384 through a circuit traced as follows: from line 381, contacts F1 which are now in the position shown, card feed clutch magnet 384, cam contacts FC6, contacts C1, stop key contacts 276, contacts N1 and P1 to line 382. Reinitiation of the card feed is prevented until the closure of contacts F1 and P1. It may be mentioned that relay magnet C is maintained energized through stick contacts C2 and cam contacts FC8 which open after the feed has been initiated. Early in the reinitiation of the card feed cycle, cam contacts FC4 close, energizing relay magnet B closing the stick contacts B2, providing a holding circuit for relay magnet B through the PR reset contacts 271, now closed. The energization of relay magnet B also closes contacts B1.

With current supplied from line 382 to the common strip 222 and with the brush 223 standing upon the first of the spots 221 at the first product punching position, punching will commence, there being a readout through the related section of the readout device PRO of the PR accumulator and energization of punch selector magnets 407. The closure of relay contacts B1 also supplies current to contacts 408 in the punch, which contacts are closed by interposer action in the punch in the usual way to supply current to the main punch operating magnet 409. Contacts 408 correspond to contacts 94 of Bryce Patent 1,866,995. Magnet 409 corresponds to punch magnet 54 of the Bryce patent. Punching will continue until the completed product is read out and punched. When the punching is completed, the card carriage rack 182 will escape beyond the last column position. Contacts P5 are closed to energize relay magnet K, shifting relay contacts K1 to establish a circuit to the eject magnet 232. The punched card will then be ejected from the punch.

A new multiplying operation will then be initiated upon the succeeding record card. Such a succeeding operation is initiated by the closure of relay contacts K2 and F2 (Fig. 12a) and by the reset of the PR accumulator. The reset of the PR accumulator initiates a new operation upon the following card in the manner previously explained. It may also be explained that upon reset of the PR accumulator, reset contacts 271 (Fig. 12f) open to break the holding circuit for relay magnet B and causes relay contacts B1 to open the circuit to the punch operating magnets and to cut off the circuit to the common strip 222 of the punch.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a multiplying machine, a multiplier receiving device, means for entering a multiplier digit therein, a multiplicand receiving device, means for entering a multiplicand amount therein, means settable under control of said multiplier and multiplicand receiving devices to represent the left hand components of the partial products of a multiplier digit and a multiplicand amount, a product receiving device, an emitting structure for emitting a series of impulses representative of the digits, means controlled by said multiplier and multiplicand receiving devices for selecting impulses from said series of impulses, representative of the right hand components of the partial products of said multiplier digit and multiplicand amount, for control of said product receiving device, further means jointly controlled by the multiplier and multiplicand receiving devices for ascertaining whether tens carry digits are required in higher orders of the product, and means controlled by said first named settable means and said further means for cooperating with said selecting means to select impulses from said series of impulses representative of the complete product of said multiplier digit and said multiplicand amount.

2. In a multiplying machine, a multiplier receiving device, means for entering a multiplier digit therein, a multiplicand receiving device, means for entering a multiplicand amount therein, an emitter for emitting timed impulses representative of digits, a set of wires connected to said emitter, one for each digit, each wire receiving an impulse at a time corresponding to a related digit, a product receiving accumulator, entry controlling magnets therefor, means jointly controlled by said multiplier and multiplicand receiving devices for initially connecting said wires to said magnets to direct impulses thereto in accordance with the right hand components of the partial products of the two factors, a set of amount representing relays, further means jointly controlled by said multiplier and multiplicand receiving devices for representing the left hand components of said partial products on said relays, still further means jointly controlled by the multiplier and multiplicand receiving devices for ascertaining whether tens carry digits are required in higher orders of the product, means controlled by said relays and said still further means for effecting an adjustment of said initial connections to direct impulses to said magnets in accordance with the complete product of the two factors, said connections being effected prior to the operation of said emitter so that upon operation thereof impulses representative of the complete product will be transmitted through the connections to enter the complete product into said product receiving accumulator.

3. In a multiplying machine, a multiplier receiving device, means for entering a multiplier digit therein, a multiplicand receiving device, means for entering a multiplicand amount therein, an emitting structure for emitting timed impulses representative of digits, a set of wires connected to said emitting structure, one for each digit, each wire receiving an impulse at a time corresponding to a related digit, a product receiving accumulator, entry controlling magnets therefor, means jointly controlled by said multiplier and multiplicand receiving devices for initially connecting said wires to said magnets to direct impulses thereto in accordance with the right hand components of the partial products of the two factors, a set of amount representing relays, further means jointly controlled by said multiplier and multiplicand receiving devices for representing the left hand components of said partial products on said relays, still further means jointly controlled by the multiplier and multiplicand receiving devices for ascertaining whether tens carry digits are required in higher orders of the product, means controlled by said relays and said still further means for effecting an adjustment of said initial connections to direct impulses to said magnets in accordance with the complete product of the two factors, said connections being concurrently established prior to the operation of said emitting structure so that upon operation thereof impulses representative of the complete product will be transmitted through the connections to enter the complete product into said product receiving accumulator.

4. In a multiplying machine, a set of relay contacts settable to represent the units digit of a multiplicand, a second set of relay contacts settable to represent the tens digit of a multiplicand, a third set of relay contacts settable to represent a multiplier digit, circuit connections between said sets of contacts arranged in accordance with the values of two place multiplicand amounts and multiplier digits whose product requires a tens carry into a higher order to complete a series circuit connection through the three sets of contacts when the product of any multiplier digit times a two place multiplicand results in a tens carry into a higher order, and a magnet included in said series connection.

5. In a multiplying machine, a set of relay contacts settable to represent a digit in a denominational order of a multiplicand, a second set of relay contacts settable to represent the digit in the next higher order of said multiplicand, a third set of relay contacts settable to represent a multiplier digit, circuit connections between said sets of contacts arranged in accordance with the values of adjacent pairs of multiplicand digits and multiplier digits whose product requires a tens carry into a higher order to complete a series circuit connection through the three sets of contacts when the product of any multiplier digit times the digits in the two said multiplicand orders requires a tens carry into a higher order and a magnet included in said series connection.

6. In a multiplying machine, a set of relay contacts settable to represent the units digit of a multiplicand, a second set of relay contacts settable to represent the tens digit of said multiplicand, a third set of relay contacts settable to represent the hundreds digit of said multiplicand, a fourth set of relay contacts settable to represent a multiplier digit, circuit connections between said sets of contacts arranged in accordance with the values of three place multiplicand amounts and multiplier digits whose product requires a tens carry into a fourth order to complete a series circuit through the four sets of contacts when the product of any multiplier digit times a three place multiplicand results in a tens carry into a higher order, and a magnet included in said series connection.

7. In a multiplying machine, a set of nine wires, each representing a digit and its tens complement, an emitter connectable to said wires for multiplier digits 1 to 5 to send true number impulses through the wires, a second emitter connectable to said wires for multiplier digits 6 to 9 to send complemental impulses through the wires, five sets of contacts, a contact in each set being settable to represent the same multiplicand digit, each set being related to one of the digits 1 to 5 and connected to said wires to receive impulses from either of said emitters, representative of the right hand digits of the product of the multiplicand digit and the related multiplier digit, five contacts, one for each of the digits 1 to 5, each connected to a related set of said sets of multiplicand contacts, and settable to represent a multiplier digit 1 to 5 or the complement of a multiplier digit 6 to 9, means for determining whether the multiplier digit is from 1 to 5 or 6 to 9, means controlled thereby for rendering the appropriate emitter effective, a magnet connected to said five multiplier representing contacts, said contacts completing a connection to said magnet from a wire of said set of nine wires, related to the units digit of the product when the multiplier is from 1 to 5, and from a wire related to the tens digit complement of the units digit of the product when the multiplier is from 6 to 9.

8. In a machine of the class described, a readout device comprising a set of contacts settable to represent a multiplicand, a set of contacts settable to represent any multiplier from 1 to 5, a set of input lines representing the digits, a set of denominationally ordered output lines, a tens carry determining device controlled by part of each of said sets of contacts, a left hand partial product component determining device controlled by another part of each of said sets of contacts, normally incomplete circuit connections intermediate said input and output lines, and means jointly controlled by both said determining means and a still further part of each of said sets of contacts for selectively completing said circuit connections to connect each of the denominationally ordered output lines to the digit representing input lines which are representative of the product of the multiplicand times the multiplier digit set on said set of multiplier representing contacts.

9. In a machine of the class described, a readout device comprising a set of contacts settable to represent a multidenominational multiplicand, a set of contacts settable to represent the digit 3, a set of input lines representing the digits, a set of denominationally ordered output lines, a tens carry determining device controlled by part of each of said sets of contacts, a left hand partial product component determining device controlled by another part of each of said sets of contacts, normally incomplete circuit connections intermediate said input and output lines, and means jointly controlled by both said determining means and a still further part of each of said sets of contacts for selectively completing said circuit connections to connect each of the denominationally ordered output lines to the digit representing input lines which are representative of the product of the multiplicand times 3.

10. In a machine of the class described, a readout device comprising a set of contacts settable to represent a multiplicand, a set of contacts settable to represent any multiplier from 6 to 9, a set of input lines representing the digits, a set of denominationally ordered output lines, a tens carry determining device controlled by part of each of said sets of contacts, a left hand partial product component determining device controlled by another part of each of said sets of contacts, normally incomplete circuit connections intermediate said input and output lines, and means jointly controlled by both said determining means and a still further part of each of said sets of contacts for selectively completing said circuit connections to connect each of the denominationally ordered output lines to the digit representing input lines which are representative of the product of the multiplicand times the multiplier digit set on said set of multiplier representing contacts.

11. In a multiplying machine, a multiplicand receiving device settable to represent a multidenominational multiplicand, a multiplier receiving device settable to represent any multiplier digit, an impulse emitting means for emitting a series of impulses representative of the digits, a product receiving means for receiving a multidenominational amount, a single adjustable circuit network intermediate said emitting means and said receiving means arranged in accordance with tables of multiplication and addition, means controlled by said multiplicand and multiplier receiving devices for directly adjusting said circuit network upon setting of said multiplicand and multiplier receiving devices to obtain and add together all components of a complete product by selecting from said series of impulses the ones representing the complete product and transmitting the same through the adjusted network to control said product receiving means accordingly.

12. The invention set forth in claim 11 in which the means controlled by said multiplicand and multiplier receiving devices includes means controlled by part of said devices for adjusting the circuit network in accordance with one set of partial products, further means controlled by another part of said devices for adjusting the circuit network in accordance with the other set of partial products, and still further means controlled by a third part of said devices for adjusting the circuit network in accordance with tens carry requirements, all said adjustments occurring concurrently to effect an ultimate adjustment in accordance with the complete product.

13. In a multiplying machine, an impulse emitting means, a product accumulator responsive to impulses from said emitting means, means for effecting repeated operation of said emitting means, a circuit network intermediate the emitting means and accumulator, a plurality of sets of contacts included in said network wired in accordance with arithmetical tables, means for adjusting one set of said contacts to represent a multidenominational amount, means operative for each operation of said emitting means for adjusting another set of contacts to represent a multiplier digit and further means operative for each operation of said emitting means for adjusting a third set of contacts to represent one of the components of the product of said amount and a multiplier digit, and still further means operative for each operation of said emitting means for adjusting a fourth set of contacts in accordance with tens carry requirements for the current multiplier digit and multiplicand amount, all said sets of contacts upon adjustment causing said network to direct impulses to the accumulator representative of the complete product of the amount times the multiplier digit, column shift devices included in said network and adjustable between each operation of said emitting means to enter the subproducts in progressively adjacent order during the successive operations of the emitting means whereby the several subproducts will be summed up to form a complete product of two multidenominational factors.

14. In a multiplying machine, a multiplier receiving device, means for entering a multiplier digit therein, a multiplicand receiving device, means for entering a multiplicand amount therein, means settable under control of said multiplier and multiplicand receiving devices to represent the left hand components of the partial products of a multiplier digit and a multiplicand amount in combinational code form as a true number for multiplier digits 1 to 5 and as a complementary number for multiplier digits 6 to 9, a product receiving device responsive to electrical impulses, an emitter for emitting a series of impulses representative of the digits in the order 9, 8, 7 . . . 1, a second emitter for emitting a series of impulses representative of the digits in the order 1, 2, 3 . . . 9, means controlled by the multiplier receiving device for rendering the first emitter effective when the multiplier digit is 1 to 5 and the second emitter effective when the multiplier digit is 6 to 9, means controlled by said multiplier and multiplicand receiving devices for selecting impulses from the effective series of impulses to control the product receiving device in accordance with the right hand components of the partial products of said multiplier digit and multiplicand amount, further means jointly controlled by the multiplier and multiplicand receiving devices for ascertaining whether tens carry digits are required in higher orders of the product, and means controlled by said first named settable means and said further means for cooperating with said selecting means to select impulses from the effective series of impulses to control the product receiving device in accordance with the complete product of said multiplier digit and said multiplicand amount.

15. In a machine of the class described, a device settable to represent a multidenominational multiplicand, a device settable to represent a multiplier digit, multiplying means including a product receiving device controlled by part of said settable devices for determining the left and right hand partial product components for summation and entry into said receiving device, means controlled by another part of said settable devices for ascertaining in advance of multiplying what the tens carry requirements are for the factors set up, and means controlled by said tens carry ascertaining means for controlling the summation of said components to effect entry of the complete product into said receiving device.

16. In a multiplying machine, an emitting means for emitting a series of impulses representative of the digits, an accumulator responsive to said digital impulses for receiving multidenominational amounts, a circuit network intermediate said emitting means and said accumulator for transmitting the impulses, a multiplicand receiving device, settable to represent an amount, a multiplier receiving device, settable to represent a digit, a first means controlled by the multiplicand receiving device for adjusting said network in accordance with said amount, a second means jointly controlled by both receiving devices for ascertaining the left hand partial product components of the factors and effecting a further adjustment of said network, a third means jointly controlled by both receiving devices for ascertaining the tens carry requirements for the summation of left and right hand partial product components of the factors and effecting a still further adjustment of said network, a fourth means controlled by the multiplier receiving device for adjusting said network in accordance with said digit, said network upon said several adjustments connecting the emitting means and the accumulator for entry of an amount representing the product of the factors.

ARTHUR H. DICKINSON.

CERTIFICATE OF CORRECTION.

Patent No. 2,350,499. June 6, 1944.

ARTHUR H. DICKINSON.

It is hereby certified that error appears in the printed specification of the above numbered patent requiring correction as follows: Page 11, first column, line 35, after the word "emitting" strike out --a--; lines 56 and 58, and second column, line 5, for "emitter" read --emitting structure--; and that the said Letters Patent should be read with this correction therein that the same may conform to the record of the case in the Patent Office.

Signed and sealed this 15th day of August, A. D. 1944.

(Seal)

Leslie Frazer
Acting Commissioner of Patents.